June 23, 1931.  R. K. POTTER  1,811,024
PHOTO ELECTRIC TUBE
Original Filed Sept. 8, 1926
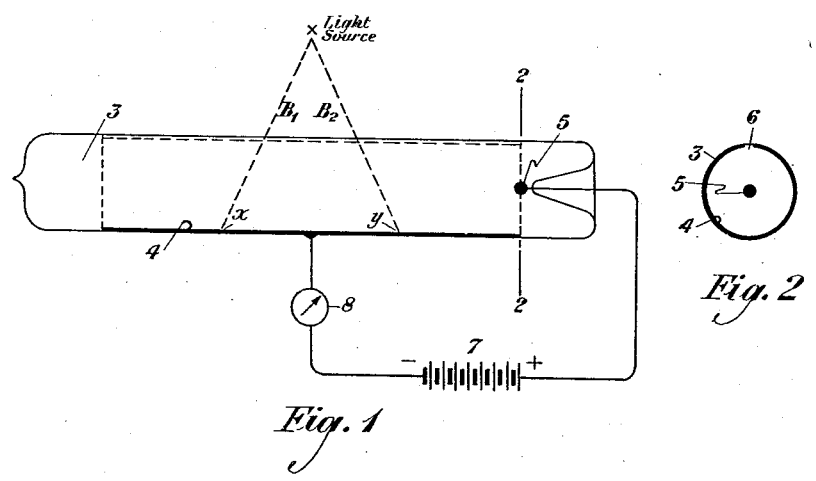
INVENTOR
R. K. Potter
BY
ATTORNEY Patented June 23, 1931

1,811,024

UNITED STATES PATENT OFFICE

RALPH K. POTTER, OF NEW YORK, N. Y., ASSIGNOR TO AMERICAN TELEPHONE AND TELEGRAPH COMPANY, A CORPORATION OF NEW YORK

PHOTO-ELECTRIC TUBE

Original application filed September 8, 1926, Serial No. 134,298. Divided and this application filed September 8, 1926, Serial No. 134,299. Renewed July 19, 1928.

This invention relates to photo-electric cells, and more particularly to photo-electric cells having a photo-sensitive cathode, an anode, a source of voltage connected between the electrode terminals, and a gas content allowing ionization by collision.

In the usual form of photo-electric cell of this type, the output of the cell is proportional to the quantity or intensity of the incident light. It is the object of this invention to provide a satisfactory photo-electric cell which is responsive not only to variation in the quantity of the light but also to the displacement of an incident light beam of constant or varying intensity. Such a cell is advantageous, especially in certain reproduction methods in which it obviates the necessity of including special optical means as a part of the device.

In general the cell embodying my invention is so arranged that the accelerating field over the region between the sensitive area of the cathode and the anode is graduated the magnitude of the effective accelerating field being different for different positions of the light beam.

If the accelerating field between the electrodes of a photo-electric cell is sufficient to remove all of the electrons as fast as they are released from the cathode by an incident light beam, and if there is no gas present in the cell envelope, the output will depend solely upon the quantity of light. There will be no change in the output current with an increase of the anode potential. If, however, gas is present in the tube, the output is no longer a simple function of the quantity of incident light but depends upon the kind of gas, its pressure and temperature, the electrode spacing, and the strength of the accelerating field. The electrons released by the photo-electric action cause ionization of the gas if the means free path of the gas molecules is shorter than the path between the electrodes and if the accelerating field is strong enough to give an electron a sufficient velocity before it strikes. In familiar types of cell, many collisions take place in the distance between the cathode and the anode. Since each collision releases more electrons, the action is cumulative. The total output current of a photo-electric cell of such type may be represented by the following relation:

$$i = i_0 \epsilon \left[ pdN\epsilon^{(-NVpd/E)} \right]$$

in which $i_0$ is the current due to photo-electric effect alone, $\epsilon$ is natural logarithmic base (constant).

$p$ is the pressure of the gas in the cell, $d$ is the distance between the electrodes, N and V are the ionization constants, and E is the potential between the electrodes.

The form of photo-electric cell described in detail hereinafter is shown in Figure 4 of my application filed as of even date herewith and numbered 134,298, and forms a division thereof but is not specifically claimed therein.

My invention will be more clearly understood when the following description is read with reference to the accompanying drawings. Figure 1 of the drawings shows the cell in longitudinal section, and Fig. 2 is a cross-sectional view of the cell, taken on the line 2—2 of Fig. 1. Like numerals of reference in the two figures of the drawings designate corresponding parts of the device.

The cell comprises the evacuated envelope or tube 3. The cathode 4 is of a light-sensitive material. The anode 5 is specifically shown as a small sphere, and may be mounted substantially in the position shown in the drawings. It is to be understood, however, that the form and position of the anode may be varied to produce the desired relation to the cathode. The light beam enters through the slit or window 6 shown in Fig. 2. A battery 7 is connected between the cathode 4 and the anode 5, as shown in the drawings, and has in series with it a meter 8.

The force exerted upon an electron released at any point on the cathode is determined approximately by the distance between the anode and the point of incidence on the cathode. By a proper adjustment of the form of the anode and the space relation with respect to the cathode, a direct relation between the displacement of the incident beam and the variation of the output current may be obtained. For instance, if the incident light beam has the position $B_1$, falling upon the cathode at the point $x$, the distance from the anode 5 to the point $x$ determines the accelerating force. If the light beam takes the position $B_2$, there is a large increase in the accelerating force since the sensitized point $y$ is now much nearer the anode.

It is to be noted that the action of the cell is dependent upon a variation of "$d$" of the relation stated above.

It is to be understood that the form of the evacuated cell or chamber may be changed and other structural changes from the specific showing of the drawings may be made within the scope of the appended claim without a departure from the spirit of the invention.

What is claimed is:

A photo-electric tube comprising an elongate envelope, a light sensitive elongate cathode therein, said envelope having a longitudinal slit adapted to admit the whole of a beam of light to fall upon said cathode at different points over a substantial range of displacement of the beam, and a spherical anode positioned substantially adjacent one end of said slit.

In testimony whereof, I have signed my name to this specification this 4th day of September, 1926.

RALPH K. POTTER.